April 10, 1934.  J. M. BYRNE  1,954,663
METHOD OF PRODUCING SPECTACLE AND EYEGLASS FRAMES AND MOUNTINGS
Filed May 29, 1931
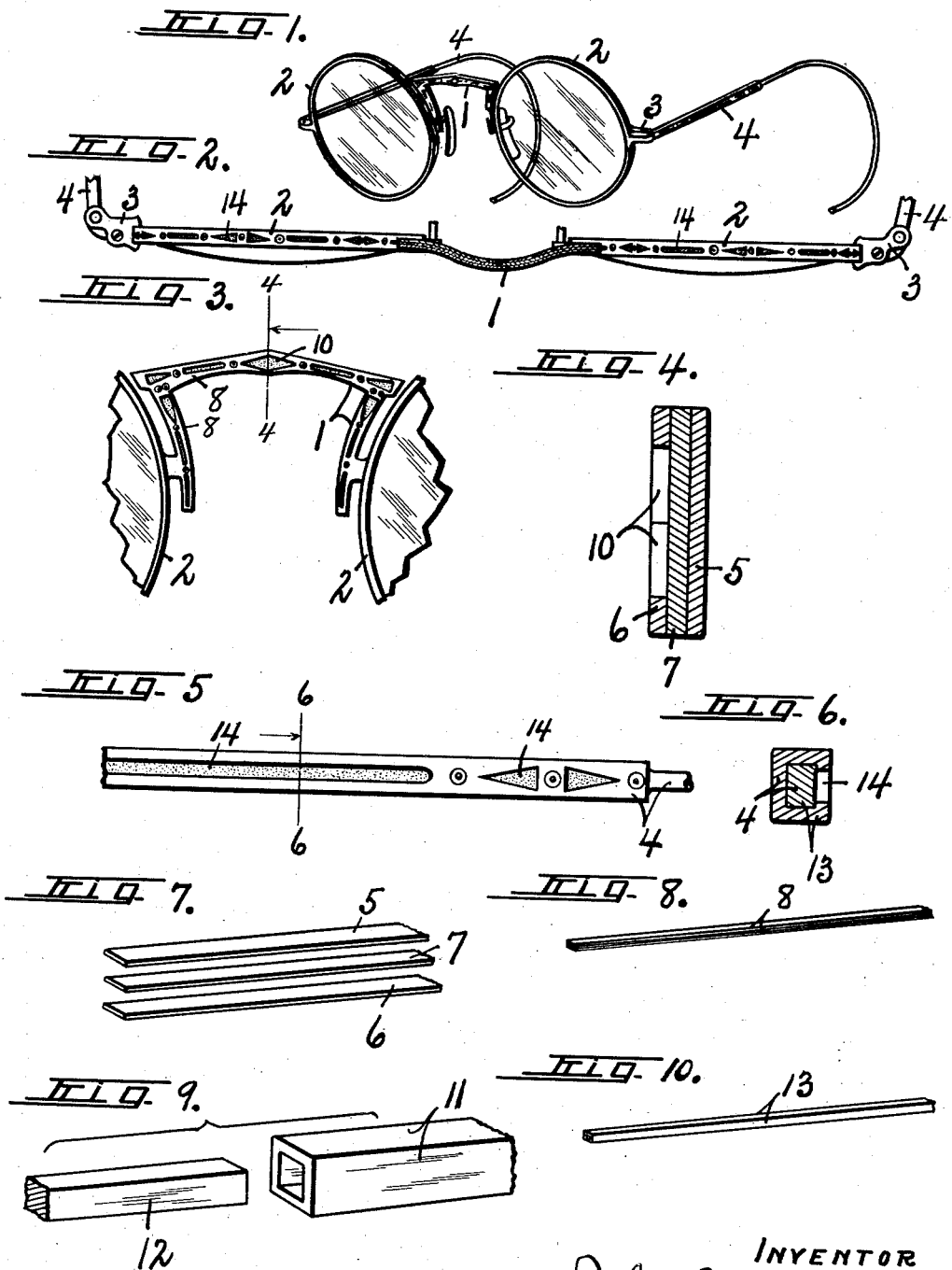

Patented Apr. 10, 1934

1,954,663

UNITED STATES PATENT OFFICE 1,954,663

METHOD OF PRODUCING SPECTACLE AND EYEGLASS FRAMES AND MOUNTINGS

John M. Byrne, Rochester, N. Y., assignor to Shuron Optical Company, Inc., Geneva, N. Y., a corporation of New York Application May 29, 1931, Serial No. 540,918

1 Claim. (Cl. 41—38)

This invention relates to certain new and useful improvements in spectacle and eye-glass frames and mountings and method of producing the same.

The main object of the invention is the production of a frame of pleasing and novel appearance by the utilization of a new method and especially the production of such a frame or frame part having a two-tone or two-color appearance.

More specifically, the production of a spectacle or eye-glass frame or mounting or part thereof produced from metallic strips, wires or sheets comprising two or more overlying pieces of metal such as gold, one or more of which is of different color from one or more others, and characterized by the fact that the engraving or certain selected portions thereof extends through the outer layer and perhaps into the underlying layer or layers so as to disclose the underlying layer or layers of different color or colors to view.

Other objects and advantages relate to the details of the structure and the method of producing the same, all as will more fully appear from the following description taken in connection with the accompanying drawing in which:—

Figure 1 is a perspective view of a spectacle frame of this invention.

Figure 2 is a top plan view of the frame omitting portions of the temples.

Figure 3 is a front elevation of the bridge showing a portion of the eye wires.

Figure 4 is a section on line 4—4, Figure 3.

Figure 5 is a side elevation of the butt portion of one of the temples.

Figure 6 is a section on line 6—6, Figure 5.

Figure 7 illustrates the manner of producing one form of the strips or wires from which the frame is formed.

Figure 8 illustrates a wire or strip formed from the parts shown in Figure 7.

Figures 9 and 10 illustrate another method of forming the wire or strip from which the frame or parts thereof is formed.

In a general way, the spectacle frame illustrated comprises the usual bridge 1, eye wires 2, end pieces 3 and temples 4 secured thereto.

Considering first the bridge 1, the parts thereof may, as shown, be formed of two or more overlying strips of metal; perhaps, preferably as illustrated in Figures 7 and 8, three strips 5, 6 and 7 are utilized.

Considering the specific embodiment illustrated in the drawing, the strips 5 and 6 may be formed of gold alloy of substantially white color known as white gold, and the intermediate strip 7 may be formed of a gold alloy of reddish color. The three strips are secured together face to face, with the reddish gold alloy strip in the center. This securement may be effected in any suitable manner as by brazing, soldering or the like, to produce a unitary strip of any desired size and of a plurality of layers of desired number, whereupon the produced composite strip may be rolled to any desired size to produce a strip 8, as illustrated in Figure 8. Layers 5, 6 and 7 of different colors retain their proportionate thickness.

The bridge 1 is formed of sections of the strip 8 cut to desired lengths and are arranged and secured together in such a manner that a strip of white gold or other color constitutes the front face of the bridge, a strip of white gold or other color constitutes the rear face of the bridge and the strip 7, for illustration, of red gold or other color is interposed between the two strips 5 and 6 as, for instance, of white gold. The front face of the bridge is then engraved with any desired or pre-determined design, portions of the engraving extending through the front strip 6 so as to disclose portions of the intermediate strip 7 or strips of different color or colors as, for instance, illustrated at 10, Figures 3 and 4. In this manner, a two-tone or multitone effect or appearance is given to the bridge when looking at it from the front.

It will be obvious that the rear strip 5 might be omitted in this form of construction without affecting the appearance from the front of the bridge, and in certain cases, this construction of two overlying strips such as 6 and 7 of different colors is satisfactory and effective in producing the desired appearance.

The eye wires 2 may be formed in the same manner from a desired length of strip 8, or perhaps preferably, the eye wires may be formed in the same manner as the butt portions of the temples 4. In this latter construction, a tube 11 as, for instance, of white gold, is first formed and a rod or bar 12 of a different color or colors of gold alloys such as reddish or other color gold, is inserted within the tube. The tube and rod may be secured together in any suitable manner and may then be rolled out to the desired size and shape, the rod and walls of the tube retaining their proportionate thickness to produce a composite wire or rod 13 as shown in Figure 10.

The butts of the temples as illustrated in Figures 5 and 6, may if desired, be formed from a section of a rod or wire 13, and the eye wire portions may likewise be formed from a section of a wire 13 of desired length, and the outer surface of the temples and the circumferential surface of the eye wires or such other parts as may be desired can then be engraved with the selected design in such a manner that the engraving extends through the wall of the shell or tube 11 and perhaps into the insert bar 12 or at least to such an extent as to disclose portions of the insert 12 to view as illustrated at 14, Figures 5 and 6.

The end pieces 3 may likewise be formed from sections of a strip 8 or if desired, of a strip 13. In this manner a desired design tube applied to a spectacle or eye-glass frame or mounting or any part, not only shows the form of the engraving but also has a two-tone or multi-tone or two-color or multi-color appearance or effect due to the disclosure of the underlying or inner layer or layers of metal which is or are of different color or colors than the outer layer.

It will be apparent that the subject-matter of this application is not restricted to any particular colors of the metallic alloys used to form the composite wire or strip or to the number of overlying strips used to produce a wire so long as different colors are used to produce a multi-tone effect nor is the invention limited to the production of a complete frame in this manner, but only to the fact that a selected portion or selected portions of the frame are so formed to give the effect described, and I do not, therefore, desire to restrict myself to any particular method of producing the wire or frame part or to any particular form of wire or frame except as the same may be specifically required by the terms of the claim hereto appended.

I claim:

The method of producing a spectacle frame wire consisting of telescopically assembling two metallic members of varying color, then forming the assembled metallic members into spectacle frame-wire formation and then engraving through the outer telescopic member to disclose portions of the inner telescopic member of different color.

JOHN M. BYRNE.